US008982731B2

(12) United States Patent
Pesonen

(10) Patent No.: US 8,982,731 B2
(45) Date of Patent: Mar. 17, 2015

(54) BLUETOOTH NETWORK CONFIGURATION

(75) Inventor: Arto Tapio Pesonen, Kempele (FI)

(73) Assignee: 9Solutions Oy, Oulu (FI)

( * ) Notice: Subject to any disclaimer, the term of this patent is extended or adjusted under 35 U.S.C. 154(b) by 245 days.

(21) Appl. No.: 13/492,013

(22) Filed: Jun. 8, 2012

(65) Prior Publication Data
US 2012/0314623 A1    Dec. 13, 2012

(30) Foreign Application Priority Data

Jun. 9, 2011    (EP) .................................... 11169280

(51) Int. Cl.
*H04L 12/28*    (2006.01)
*H04W 40/32*    (2009.01)
*H04L 12/715*    (2013.01)
*H04W 84/18*    (2009.01)

(52) U.S. Cl.
CPC ............... *H04W 40/32* (2013.01); *H04L 45/04* (2013.01); *H04W 84/18* (2013.01)
USPC ........................................................ 370/255

(58) Field of Classification Search
None
See application file for complete search history.

(56) References Cited

U.S. PATENT DOCUMENTS

2006/0089119 A1*   4/2006   Lipasti et al. ................. 455/410
2007/0060132 A1*   3/2007   Wilhelmsson et al. ....... 455/445

FOREIGN PATENT DOCUMENTS

SE    WO 0158077 A2 *    8/2001

OTHER PUBLICATIONS

Jung, performance comparison of overlaid Bluetooth Piconets (OBP) and Bluetooth Scatternet, 2006, iEEE, pp. 505-510.*
European Search Report, dated Oct. 14, 2011, issued in the priority application, European Application No. 11169280.2.
Sewook Jung et al.: "Performance comparison of overlaid Bluetooth piconets (OBP) and Bluetooth scatternet," Wireless Communications and Networking Conference, 2006. WCNC 2006. IE EE Las Vegas, NV, USA Apr. 3-6, 2006, Piscataway, NJ, USA IEEE, Piscataway, NJ, USA, Apr. 3, 2006, pp. 505-510.

* cited by examiner

*Primary Examiner* — Kouroush Mohebbi
(74) *Attorney, Agent, or Firm* — Sughrue Mion, PLLC

(57) ABSTRACT

A method, apparatus, and computer program for operating a Bluetooth network is presented. The method comprises providing a Bluetooth system comprising a plurality of Bluetooth devices forming Bluetooth piconets disconnected from each other; and providing a route for a data packet between two remote Bluetooth devices through the Bluetooth system by sequentially changing structures of the Bluetooth piconets, wherein at least some of the plurality of Bluetooth devices sequentially create and terminate connections with different Bluetooth devices as a result of the sequential change of the structures of the Bluetooth piconets.

14 Claims, 3 Drawing Sheets

BLUETOOTH NETWORK CONFIGURATION

FIELD

The invention relates to the field of radio communications and, particularly, to wireless Bluetooth networks.

BACKGROUND

Bluetooth uses a radio technology called frequency-hopping spread spectrum on an unlicensed Industrial, Scientific and Medical (ISM) 2.4 GHz short-range radio frequency band. Bluetooth provides a secure way to connect and exchange information between devices such as faxes, mobile phones, telephones, laptops, personal computers, printers, Global Positioning System (GPS) receivers, digital cameras, and video game consoles. Bluetooth is a communication protocol with a master-slave structure. A master Bluetooth device can communicate with slave devices in a Wireless User Group. This network group is called a piconet. The devices can switch roles, by agreement, and the slave can become the master at any time. The Bluetooth Core Specification allows connecting two or more piconets together to form a scatternet, with some devices acting as a bridge by playing the master role in one piconet and the slave role in another piconet (or slave in both piconets).

Bluetooth low energy (BLE) is based on Bluetooth 4.0 technology, designed with the intention to reduce power consumption of Bluetooth devices. BLE is designed to be applicable to a wide range of applications and devices in the healthcare, fitness, security and home entertainment industries. For example, it is possible for a BLE device to operate several years with a button cell battery without recharging. However, BLE specification has ruled out the possibility for the BLE device to operate in multiple piconets in the above-described manner.

BRIEF DESCRIPTION

According to an aspect of the present invention, there is provided a method comprising: providing a Bluetooth system comprising a plurality of Bluetooth devices forming Bluetooth piconets disconnected from each other; providing a route for a data packet between two remote Bluetooth devices through the Bluetooth system by sequentially changing structures of the Bluetooth piconets, wherein at least some of the plurality of Bluetooth devices sequentially create and terminate connections with different Bluetooth devices as a result of the sequential change of the structures of the Bluetooth piconets.

According to another aspect of the present invention, there is provided a Bluetooth network comprising a plurality of Bluetooth devices configured to form Bluetooth piconets disconnected from each other and to provide a route for a data packet between two remote Bluetooth devices through the Bluetooth network by sequentially changing structures of the Bluetooth piconets, wherein at least some of the plurality of Bluetooth devices sequentially create and terminate connections with different Bluetooth devices as a result of the sequential change of the structures of the Bluetooth piconets.

According to another aspect of the present invention, there is provided an apparatus comprising at least one processor and at least one memory including a computer program code. The at least one memory and the computer program code are configured, with the at least one processor, to cause the apparatus to: cause a Bluetooth device to establish and terminate Bluetooth connections with other Bluetooth devices; and sequentially create and terminate links with different Bluetooth devices of different Bluetooth piconets so as to transfer a data packet received from one piconet to another piconet.

According to yet another aspect of the present invention, some embodiments are realized by a computer program product embodied on a non-transitory computer readable medium.

Further embodiments of the invention are defined in the dependent claims.

LIST OF DRAWINGS

Embodiments of the present invention are described below, by way of example only, with reference to the accompanying drawings, in which FIG. 1 illustrates a Bluetooth system to which embodiments of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
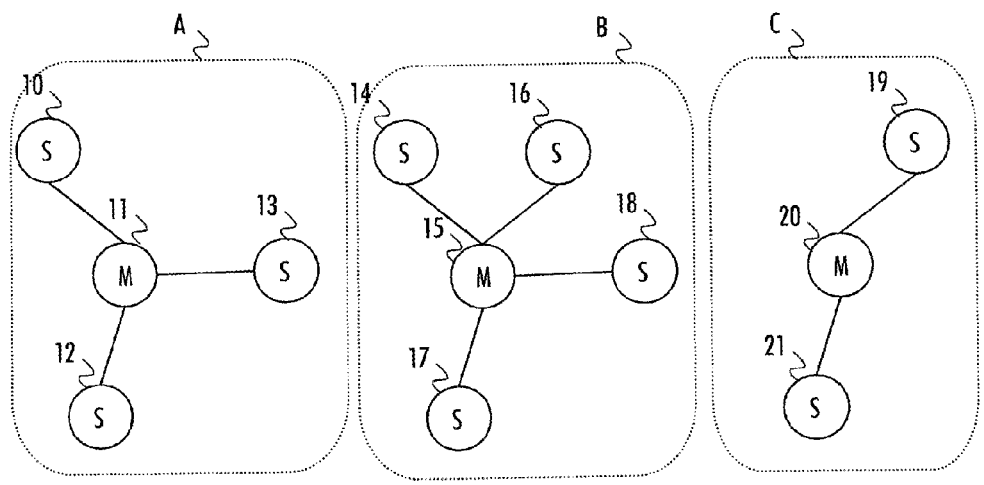

FIG. 1 illustrates a network topology to which embodiments of the invention may be applied. The network may be a Bluetooth network based on Bluetooth 4.0 specification and, particularly, Bluetooth low energy (BLE) specification. As a consequence, the Bluetooth network comprises Bluetooth devices 10 to 21 configured to operate according to the appropriate Bluetooth specification. Referring to FIG. 1, the Bluetooth devices 10 to 21 form three Bluetooth piconets denoted by reference signs A, B, and C. Bluetooth devices 10, 11, 12, and 13 form a first piconet A, Bluetooth devices 14, 15, 16, 17, and 18 form a second piconet B, and Bluetooth devices 19, 20, and 21 form a third piconet C. Bluetooth devices 11, 15, and 20 operate in a master mode, while the other Bluetooth devices operate in a slave mode. The slave devices connect to the master node of their respective piconets so as to form a star topology in each piconet A, B, C. By default, the Bluetooth devices 10 to 21 may be a member of only one piconet at a time, which means that the piconets A, B, C are disconnected from each other at any given time instant. In other words, each Bluetooth device 10 to 21 may have only one connection established at a time. In some embodiments, the Bluetooth devices 10 to 21 are prevented from belonging to a multiple piconets and time-hopping between the piconets. The Bluetooth devices 10 to 21 may also be completely wireless devices without a wired connection being supported, and at least some of the Bluetooth devices 10 to 21 may be mobile devices. For example, Bluetooth devices 11, 13, 15, 18, and 20 may be fixed devices having locations planned by an operator of the Bluetooth system. The fixed devices may provide the other Bluetooth devices with a Bluetooth coverage area in the premises of an office, for example. The fixed devices may be designed to form a route between the other Bluetooth devices and a server, for example. Each fixed device may be located in a coverage area of two neighbouring fixed devices, e.g. device 15 is in the coverage area of both devices 13 and 18, such that a concatenated route may be provided throughout the Bluetooth network. Providing the actual route throughout the network may be realized according to embodiments described below.

Figure 2:
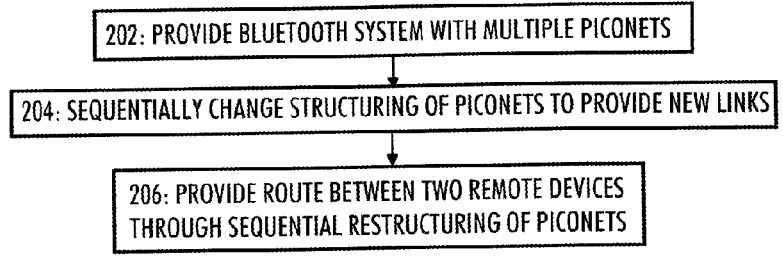
FIG. 2 illustrates a flow diagram of an embodiment for restructuring a Bluetooth system according to an embodiment of the invention.

FIG. 2 illustrates a flow diagram of a process according to an embodiment of the invention. The embodiment comprises dynamic and sequential restructuring of the Bluetooth piconets such that Bluetooth links are created and terminated dynamically such that the route throughout the network is ultimately created by the sequential restructuring. Referring to FIG. 2, in block 202 there is provided a Bluetooth system comprising a plurality of Bluetooth devices (10 to 21 in FIG. 1) forming Bluetooth piconets (A, B, C) disconnected from each other. In block 204, the piconets are sequentially restructured so as to terminate previous links and to provide new links. Thus, at least some of the plurality of Bluetooth devices sequentially create and terminate connections with different Bluetooth devices as a result of the sequential restructuring. By carrying out the restructuring in a controlled and appropriately designed manner, a route for data traffic may be provided in block 206 between two remote Bluetooth devices (e.g. devices 11 and 21). The remote Bluetooth devices 11 and 21 may be so far from each other that a direct device-to-device link is not possible due to the limited coverage areas of the devices 11 and 21. Therefore, the remote devices 11 and 21 cannot belong to the same Bluetooth piconet because of the limited operational range, and a route through the other devices must be used to deliver the data between the remote devices.

It should be noted that the flow diagram of FIG. 2 illustrates the operation of the Bluetooth system on a network level. With respect to the operation of a single Bluetooth device 10 to 21, the operation to carry out the method of FIG. 2 may comprise: causing a Bluetooth device to establish and terminate Bluetooth connections with other Bluetooth devices; and sequentially creating and terminating links with different Bluetooth devices of different Bluetooth piconets in a controlled manner so as to transfer a data packet received from one piconet to another piconet. Such operation of multiple Bluetooth devices enables the transfer of data packets between the remote devices. The operation of a single Bluetooth device may be realized by a computer program readable by a computer and, when executed by the computer, the computer program configures the Bluetooth device to carry out the above-mentioned functionality.

In some embodiments, the restructuring may comprise sequential termination of existing piconets and creation of new piconets with different structures. The topology may be maintained as the star topology used in the Bluetooth piconets. In other embodiments, some Bluetooth devices may disconnect from one piconet and subsequently connect to another piconet, thus affecting the restructuring. It should be understood that the restructuring and the termination and creation of Bluetooth piconets with different structures belongs to a normal operation of the system. In other words, the restructuring is not carried out as a result of a malfunction of the system, e.g. a broken node or a link. The restructuring is thus a function of the operational and fully functional system.

Figure 3A:
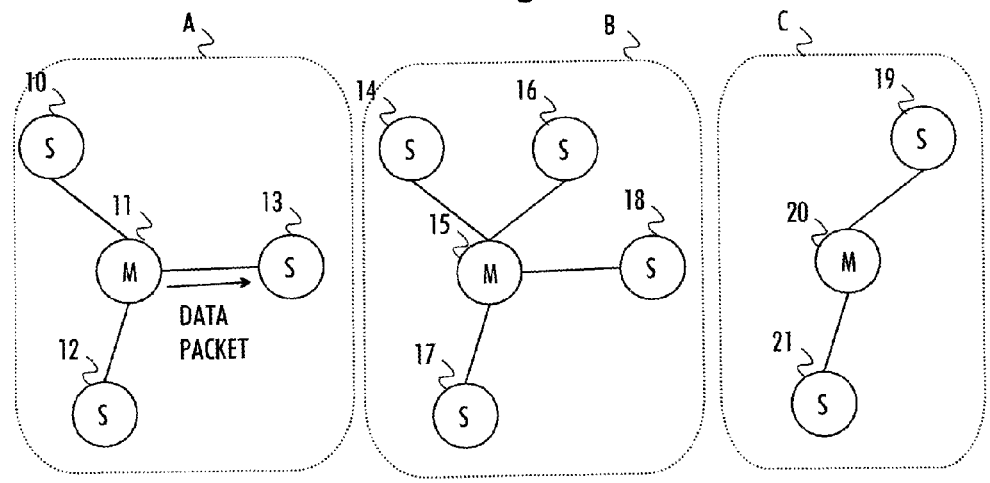
FIGS. 3A to 3D illustrate controlled restructuring of the Bluetooth system according to an embodiment of the invention.

Let us now consider an embodiment for carrying out the restructuring with reference to FIGS. 3A to 3D. Let us consider delivering a data packet from Bluetooth device 11 to Bluetooth device 21 that are originally members of different piconets. Bluetooth device 11 belongs initially to piconet A, while Bluetooth device 21 belongs initially to piconet C, as illustrated in FIGS. 1 and 3A. Let us consider a scenario where the Bluetooth device 11 transmits a data packet addressed to the Bluetooth device 21. A routing protocol utilized in the network may be arbitrary, but let us assume that the Bluetooth device 11 (the master of the piconet A) transmits the data packet first to Bluetooth device 13 which is a slave of the piconet A. With the current network structure, the Bluetooth device 13 cannot route the data packet further towards the Bluetooth device 21 at this stage, so it is configured to buffer the data packet received from the Bluetooth device 11 into a buffer memory. Other data packets may also be transferred over Bluetooth links established in the piconet A and/or in the other piconets B and C, as shown in FIG. 3A. Those data packets that are addressed to nodes in other piconets may be buffered for further transmission. However, let us consider to the routing of the single data packet for the sake of simplicity.

According to a determined rule, the structure of at least two piconets A, B, and C are modified so as to enable data transfer between the two (modified) piconets. In a simple case, the Bluetooth device 13 disconnects from the membership in the piconet A and connects to the piconet B. However, when considering that multiple data packets are being routed in the piconets, the piconets A, B, and C may be terminated and logically new piconets may be created. Let us in this case assume that the piconets A, B, and C are terminated (or released or demolished), and at least two new piconets D and E are created (see FIG. 3B). The termination may comprise disconnecting all the links of the piconets A, B, and C and creating the new piconets from the scratch. According to the modern BLE connection establishment protocol, the creation of a Bluetooth connection may be carried out within a few milliseconds. Therefore, it is possible to terminate and recreate piconets to realize a virtual scatternet realized by the sequential termination and creation of the piconets.

Figure 3B:
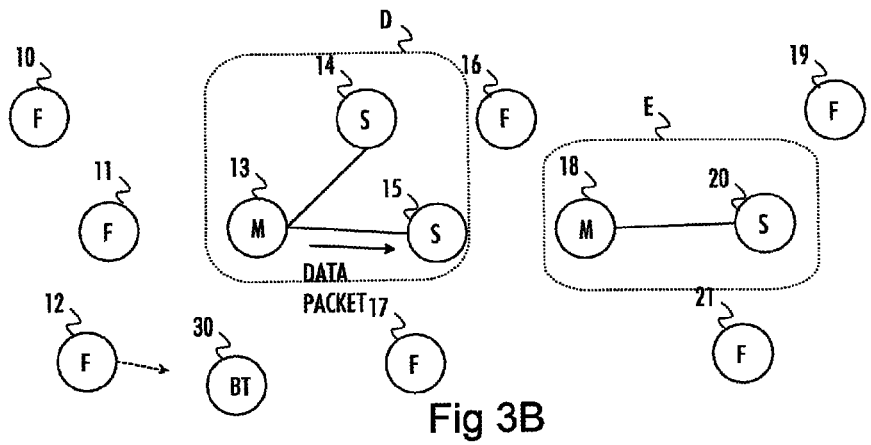

Let us now turn to FIG. 3B illustrating the Bluetooth system after the first restructuring. Node 13 buffering the data packet is now configured to operate as a new master node for piconet D and connect to Bluetooth devices 14 and 15 configured to operate as slave nodes at this stage. A second piconet E is created between Bluetooth devices 18 and 20, wherein Bluetooth device 18 operates as the master and Bluetooth device 20 as the slave. The other Bluetooth devices 10 to 12, 16, 17, 19, and 21 operate in a free mode which means that they may create Bluetooth piconets freely at this stage. This means that they may create ad hoc Bluetooth connections with other Bluetooth devices, e.g. Bluetooth device 30. The Bluetooth devices in the free mode may be configured to advertise the free mode so as to enable the other Bluetooth devices 30 to detect the availability of the Bluetooth connection from the advertisement broadcasted by the free nodes. The advertisement of the mode may be included in manufacturer-specific data (e.g. extended inquiry response data) according to the Bluetooth specification. Similarly, the master and slave nodes may advertise their current mode.

Now, since the Bluetooth device 13 has a further connection towards the destination node 21 of the data packet, the Bluetooth device 13 transmits the data packet to Bluetooth device 15 which receives the data packet. As it cannot transmit the data packet further, Bluetooth device 15 buffers the data packet for further transmission.

Figure 3C:
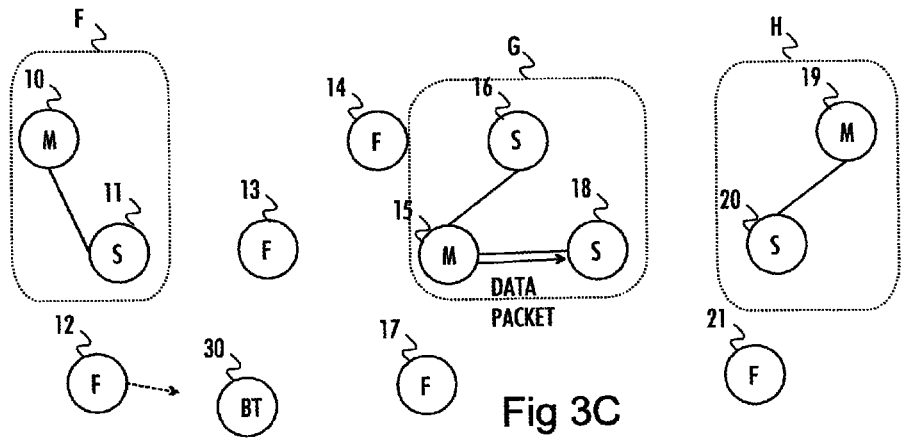

Then, the next restructuring of the Bluetooth system is affected. As illustrated in FIG. 3C, the previous piconets D and E of FIG. 3B are terminated, and now three new piconets F, G, H are created. Bluetooth device 10 operates as the master of piconet F comprising also Bluetooth device 11 as a slave; Bluetooth device 15 now assumes the master role in piconet G comprising Bluetooth devices 16 and 18 as slave devices; and Bluetooth device 19 operates as the master of piconet H comprising Bluetooth device 20 as a slave device. The other Bluetooth devices 12 to 14, 17, and 21 operate now in the free mode. Now, the Bluetooth device 15 may forward the data packet to Bluetooth device 18 which again buffers the data packet for further transmission. Other data packets may be transmitted in the newly created piconets F, G, H.

Figure 3D:
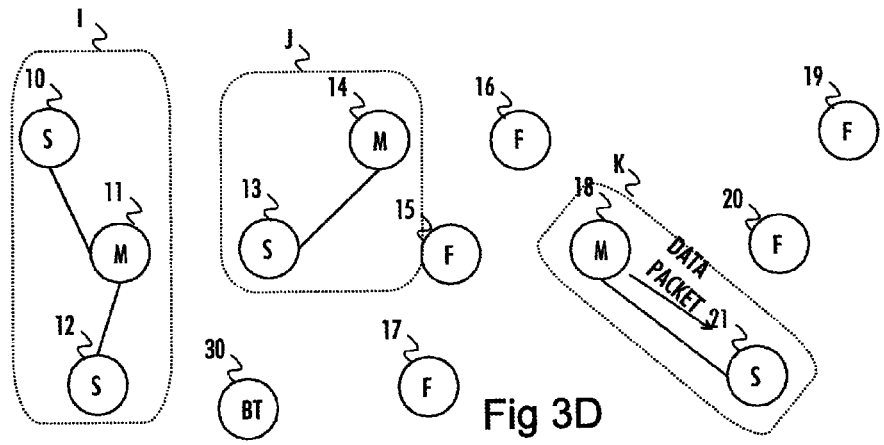

At the next stage, the structure of FIG. 3C is demolished, and piconets I, J, K of FIG. 3D are created. Bluetooth device 11 now assumes the master role in piconet I comprising Bluetooth devices 10 and 12 as slave devices; Bluetooth device 14 operates as the master in piconet J compeising Bluetooth device 13 as the slave; and Bluetooth device 18 operates as the master of piconet K comprising Bluetooth device 21 as a slave device. The other Bluetooth devices 15 to 17, 19, and 20 operate now in the free mode. Now, the Bluetooth device 18 may forward the data packet to the destination Bluetooth device 21 and, thus, the data packet reaches its final destination through the sequential restructuring of the network.

As the example illustrated in FIGS. 3A to 3D shows, there is no continuous route between the source node 11 and the destination node 21 at any stage. However, the data packet may be delivered to the destination node in a completely wireless manner by restructuring the Bluetooth system in a controlled manner so as to ultimately create the route between any two nodes in the Bluetooth system. As already mentioned, the fast connection establishment procedure of the modern Bluetooth system enables the restructuring without causing excessive end-to-end delays in the route. In an embodiment, a Bluetooth piconet is operational for less than a second between its creation and termination. In other words, a Bluetooth device belongs to one piconet at a time for less than one second before it connects to logically another piconet. In another embodiment, a Bluetooth piconet is operational for less than a half second between its creation and termination. In yet another embodiment, a Bluetooth piconet is operational for less than 100 milliseconds between its creation and termination which creates fast restructuring and further reduces end-to-end delays with longer routes. In practice, the Bluetooth piconet may be kept operational for as short as 3 ms duration, during which a message may still be transmitted.

Above, it has been mentioned that the restructuring is carried out in a controlled manner. Let us now consider some embodiments relating to how the controlled restructuring may be carried out on the network level and in an individual Bluetooth device. Some of the Bluetooth devices of the system may be fixed devices that form an infrastructure for the Bluetooth system, e.g. Bluetooth devices 10 to 21 in FIGS. 3A to 3D. Additionally, the system may comprise at least one mobile device 30. The fixed devices may store a list of neighbouring nodes with which a connection is allowed to be established in the master mode and in the slave mode. For example, a given Bluetooth device may be configured in the master mode to connect to a first set of Bluetooth devices comprising at least one Bluetooth device. The Bluetooth device may be configured in the slave mode to connect to a second set of Bluetooth devices comprising at least one Bluetooth device. The Bluetooth device may connect to any other Bluetooth device in the free mode. In one embodiment, each Bluetooth device may store a sub-pattern for each mode, e.g. the master mode. For example, the Bluetooth device connects to different Bluetooth devices in consecutive master modes and/or in consecutive slave modes. By defining the connecting nodes in each mode in this manner, it may be ensured that the route between any two nodes of the system may be realized through the fixed nodes.

Figure 4:
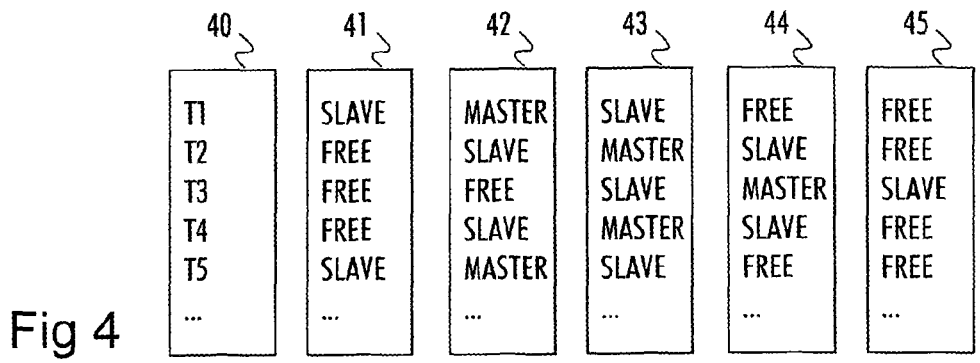
FIG. 4 illustrates tables defining state patterns for a plurality of Bluetooth devices according to an embodiment of the invention.

Let us now consider some embodiments for controlled allocation of master and slave modes with reference to FIGS. 4 and 5A to 5C. FIG. 4 illustrates an embodiment of a Bluetooth system comprising a plurality of Bluetooth devices, wherein the Bluetooth devices may belong to the system of FIGS. 1 and 3A to 3D, or to another Bluetooth system. FIG. 4 illustrates a plurality of tables 40 to 45, wherein the first table 40 on the left illustrates time instants T1 to T5, while tables 41 to 45 each illustrates the operational mode of a Bluetooth device in each time instant T1 to T5. As a consequence, the operational mode of the Bluetooth devices is changed on a timely basis, and the Bluetooth devices may be synchronized at least on a coarse level to a common clock such that the mode change is carried out approximately at the same time in the Bluetooth devices of the system. Each Bluetooth device may have a different state pattern defining the sequence of modes, but some of the Bluetooth devices may have a common pattern, particularly in a large system comprising numerous nodes. Referring to FIG. 4, a Bluetooth device having the pattern 42 first operates as the master in T1 and connects to Bluetooth devices having patterns 41 and 43, respectively, that operate as the slaves. The other Bluetooth devices having patterns 44 and 45 operate in the free mode at this stage. In the next phase represented by T2, the master role is transferred to the Bluetooth device having the pattern 43, and it connects to the Bluetooth devices of 42 and 44, while the other are in the free mode. Thereafter in T3, the master role is again transferred, now to the Bluetooth device of 44 communicating with slave devices of 43 and 45, while the other Bluetooth devices are free. Then, the master role is transferred back to the Bluetooth device of 43 in T4, and in T5 the Bluetooth device of pattern 42 has the master role. In this manner, the pattern is continued, and the pattern formed by the pattern of time instants T1 to T4 may repeated indefinitely. This pattern of operational modes allow transfer of the master role between Bluetooth devices of 42 to 44, and it may be suitable to the Bluetooth system consisting of the Bluetooth devices represented by 41 to 45. The Bluetooth devices may form a pipeline for data routing, wherein the master role is switched between all the other devices except the end nodes 41 and 45 of the pipeline. However, another type of pattern where the end nodes 41 and 45 operate as the masters is also possible. As mentioned above, the time instants T1 to T5 may represent time periods of less than one second.

Figure 5A:
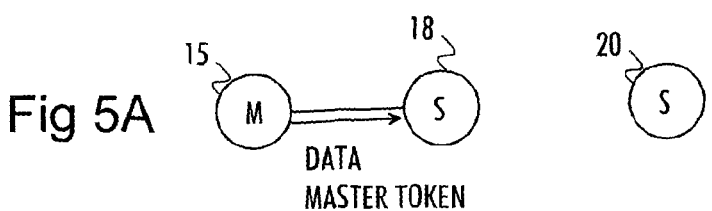
FIGS. 5A to 5C illustrate mode transition in a Bluetooth device according to an embodiment of the invention.
Figure 5B:
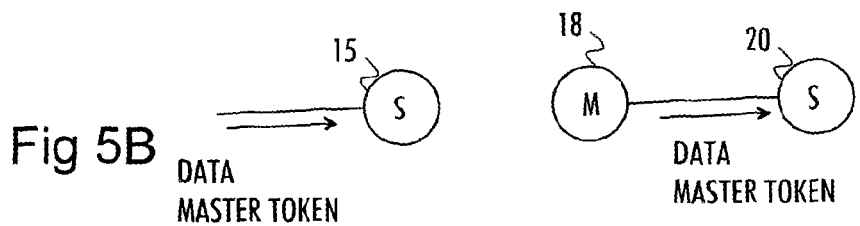
Figure 5C:
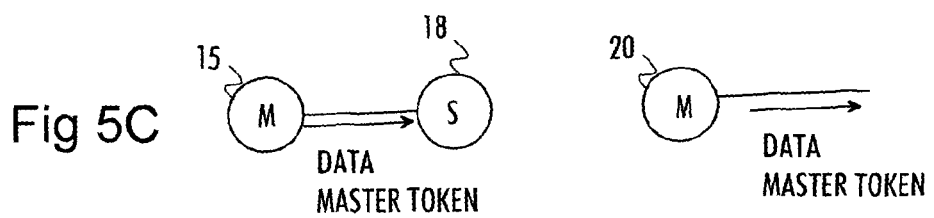

In the embodiment of FIG. 4, the transfer of the master role may be seen as a moving "train" that travels between "stations" (nodes) represented by 42, 43, 44. In another embodiment utilizing a similar moving master train procedure, the master role is handed over by using a master token or another type of control message instructing a given node to assume the master role. The master token may be a control message transferred between the Bluetooth devices in the system, or the master token may be a control message assigned by a centralized control element, e.g. an operation and maintenance server controlling the operation of the system. FIGS. 5A to 5C illustrate the embodiment where the master token is passed within the system, and a Bluetooth device receiving the master token operates as the master for a determined period of time before passing the master token to a neighbouring Bluetooth device. Referring to FIG. 5A, a first Bluetooth device 15 has the possession of the master token and, therefore, operates in the master mode in the first stage. A second Bluetooth device 18 and a third Bluetooth device 20 are configured to operate in the slave mode (or in the free mode), because they are currently not in the possession of the master token. The Bluetooth devices 15, 18, 20 may be the corresponding nodes of FIGS. 3A to 3D. The master node 15 then connects to the second Bluetooth device 18 so as to transfer data between the devices 15 and 18 (FIG. 5A). Meanwhile, the third Bluetooth device 20 may connect to other nodes. The data transfer may last for a predetermined duration (e.g. less than one second) until the data transfer and the Bluetooth connection is terminated. During the data transfer, the master node 15 passes the master token over to the second Bluetooth device 18. Subsequently, the second Bluetooth device 18 assumes the master role, and it is configured to connect to the third Bluetooth device 20 so as to transfer data and to pass the master token over to the third Bluetooth device 20 (FIG. 5B). Meanwhile, the first Bluetooth device 15 may be connected in the slave to another Bluetooth device so as to transfer data and to receive another master token. In some embodiments, a plurality of master tokens is transferred in the system. Thereafter, the first Bluetooth device 15 again assumes the master role as a result of receiving the other master token. The first Bluetooth device 15 then connects once again to the second Bluetooth device 18 (FIG. 5C) so as to transfer data and pass the second master token to the second Bluetooth device 18. Meanwhile, the third Bluetooth device 20 controlling the master token operates in the master mode and connects to another Bluetooth device so as to transfer data and pass the master token onwards in the network.

Figure 6:
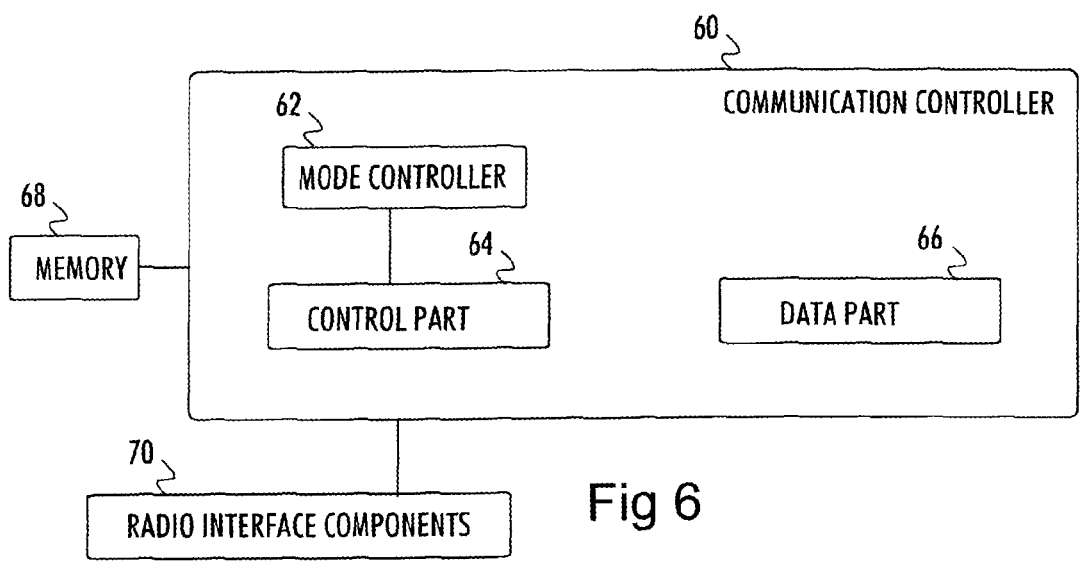
FIG. 6 illustrates a block diagram of an apparatus according to an embodiment of the invention.

FIG. 6 illustrates an embodiment of an apparatus comprising means for carrying out the functionalities of the Bluetooth device according to any one of the above-described embodiments. The apparatus may be a dedicated Bluetooth device providing a fixed Bluetooth infrastructure for data routing, but it may have other functionalities. The apparatus may be a sensor of a location tracking system sensing the presence of other Bluetooth devices carried by users that are being tracked. The apparatus may be configured to detect an identifier of such devices and to report the identifiers to a location tracking server, for example. The apparatus may also provide such tracked apparatuses and their users with a communication connection with the server through the Bluetooth infrastructure. In other embodiments, the apparatus may be a computer (PC), a laptop, a tabloid computer, a cellular phone, a palm computer, or any other apparatus provided with radio communication capability. In another embodiment, the apparatus is comprised in any one of the above-mentioned communication apparatuses, e.g. the apparatus may comprise a circuitry, e.g. a chip, a processor, a micro controller, or a combination of such circuitries in the communication apparatus.

The apparatus may comprise a communication controller circuitry 60 configured to control the communications in the communication apparatus. The communication controller circuitry 60 may comprise a control part 64 handling control signaling communication with respect to establishment, operation, and termination of Bluetooth connections. The control part 64 may also carry out any other control functionalities related to the operation of the Bluetooth links, e.g. transmission, reception, and extraction of control frames including the master token, as described above. The communication controller circuitry 60 may further comprise a data part 66 that handles transmission and reception of payload data over the established Bluetooth connections. The data part 66 may also comprise a routing control logic that is configured to determine whether a given data packet is to be transmitted over a current link or to buffer the data packet to wait for a creation of an appropriate link. The communication controller circuitry 60 further comprises a mode controller circuitry 62 configured to control the operational mode of the Bluetooth device according to predetermined rules. For example, if the apparatus is configured to assume the master role through the master token, the mode controller circuitry 62 may configure the apparatus to operate in the slave or the free mode until it receives the master token through the control part 64. Thereafter, the mode controller circuitry 62 may configure the apparatus to operate in the master mode for a determined time period and to transmit the master token to another apparatus. In the other embodiments where the operational mode of the apparatus is defined by the state pattern 41 to 45, the mode controller circuitry 62 may configure the apparatus to assume appropriate roles as defined by its state pattern.

The circuitries 62 to 66 of the communication controller circuitry 60 may be carried out by the one or more physical circuitries or processors. In practice, the different circuitries may be realized by different computer program modules. Depending on the specifications and the design of the apparatus, the apparatus may comprise some of the circuitries 60 to 66 or all of them.

The apparatus may further comprise the memory 68 that stores computer programs (software) configuring the apparatus to perform the above-described functionalities of the Bluetooth device. The memory 68 may also store communication parameters and other information needed for the Bluetooth communications. The memory 68 may serve as the buffer for the buffered data packets, and it may also store the above-described table (41 to 45) that defines the state pattern for the device. The apparatus may further comprise radio interface components 70 providing the apparatus with radio communication capabilities with other Bluetooth devices. The radio interface components 70 may comprise standard well-known components such as amplifier, filter, frequency-converter, (de)modulator, and encoder/decoder circuitries and one or more antennas. The apparatus may further comprise a user interface enabling interaction with the user. The user interface may comprise a display, a keypad or a keyboard, a loudspeaker, etc.

In an embodiment, the apparatus carrying out the embodiments of the invention in the communication apparatus comprises at least one processor and at least one memory including a computer program code, wherein the at least one memory and the computer program code are configured, with the at least one processor, to cause the apparatus to carry out the steps of any one of the processes of FIGS. 2 to 5C. Accordingly, the at least one processor, the memory, and the computer program code form processing means for carrying out embodiments of the present invention in the wireless communication apparatus.

An embodiment provides an apparatus comprising at least one processor and at least one memory including a computer program code, wherein the at least one memory and the computer program code are configured, with the at least one processor, to cause the apparatus to carry out the functionalities of the Bluetooth device according to any one of the above-described embodiments.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described in FIGS. 4 to 8 may also be carried out in the form of a computer process defined by a computer program. The computer program may be in source code form, object code form, or in some intermediate form, and it may be stored in some sort of carrier, which may be any non-transitory entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to the Bluetooth system(s) defined above but also to other wireless communication systems. It should be appreciated that there may be systems other than the Bluetooth (Low Energy) that would benefit from the embodiments of the present invention. The protocols used, the specifications of wireless telecommunication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
providing a Bluetooth system comprising a plurality of Bluetooth devices forming Bluetooth piconets disconnected from each other;
providing a route for a data packet between two remote Bluetooth devices through the Bluetooth system by sequentially changing structures of the Bluetooth piconets, wherein at least some of the plurality of Bluetooth devices sequentially create and terminate connections with different Bluetooth devices by operating as a slave device of one Bluetooth piconet, receiving a master token from a master device of the one Bluetooth piconet, terminating a connection to the one Bluetooth piconet and, after the termination of the connection, creating a connection in another Bluetooth piconet in which the Bluetooth device operates as a master device of the other Bluetooth piconet as allowed by possession of the master token, wherein the other Bluetooth piconet may include more than one slave device.

2. The method of claim 1, wherein the sequential change of the Bluetooth networks comprises: sequentially terminating and creating Bluetooth piconets with different network structures.

3. The method of claim 2, wherein a duration between the creation and termination of a given Bluetooth piconet is less than one second.

4. The method of claim 1, further comprising: shifting at least one master role between different Bluetooth devices.

5. The method of claim 4, wherein the master role is sequentially from a master Bluetooth device of a piconet to a slave Bluetooth device of the piconet in connection with terminating the piconet, and wherein the slave Bluetooth device of the piconet assumes the master role in connection with creating a subsequent new piconet.

6. The method of claim 1, wherein the sequential change of the structures of the Bluetooth piconets is a function of an operational Bluetooth network.

7. The method of claim 1, wherein each Bluetooth device is a member of only one piconet at a time.

8. The method of claim 1, wherein at no time instant there is a continuous route between the two remote devices.

9. A Bluetooth network comprising:
a plurality of Bluetooth devices configured to form Bluetooth piconets disconnected from each other and to provide a route for a data packet between two remote Bluetooth devices through the Bluetooth network by sequentially changing structures of the Bluetooth piconets, wherein at least some of the plurality of Bluetooth devices sequentially create and terminate connections with different Bluetooth devices by operating as a slave device of one Bluetooth piconet, receiving a master token from a master device of the one Bluetooth piconet, terminating a connection to the one Bluetooth piconet and, after the termination of the connection, creating a connection in another Bluetooth piconet in which the Bluetooth device operates as a master device of the other Bluetooth piconet as allowed by possession of the master token, wherein the other Bluetooth piconet may include more than one slave device.

10. An apparatus comprising:
at least one processor; and
at least one memory including a computer program code, wherein the at least one memory and the computer program code are configured, with the at least one processor, to cause the apparatus to:
cause a Bluetooth device to establish and terminate Bluetooth connections with other Bluetooth devices; and
sequentially create and terminate links with different Bluetooth devices of different Bluetooth piconets so as to transfer a data packet received from one piconet to another piconet by operating as a slave device of one Bluetooth piconet over a first link, receiving a master token over the first link from a master device of the one Bluetooth piconet, terminating the first link and, after the termination of the first link, creating a second link in another Bluetooth piconet in which the apparatus operates in a master device of the other Bluetooth piconet as allowed by possession of the master token, wherein the other Bluetooth piconet may include more than one slave device.

11. The apparatus of claim 10, wherein the at least one memory and the computer program code are configured, with the at least one processor, to cause the apparatus to be a member of only one Bluetooth piconet at a time.

12. The apparatus of claim 10, wherein the at least one memory and the computer program code are configured, with the at least one processor, to cause the apparatus to store in the at least one memory a state pattern and to switch between a master mode, a slave mode, and a free mode according to the state pattern.

13. The apparatus of claim 12, wherein the at least one memory and the computer program code are configured, with the at least one processor, to cause the apparatus to advertise the free mode so as to allow other Bluetooth devices to connect to the apparatus in the free mode.

14. The apparatus of claim 10, wherein the at least one memory and the computer program code are configured, with the at least one processor, to cause the apparatus to transmit the master token over the second link and to assume either a slave mode or a free mode after terminating the second link.

* * * * *